3,810,758
PHOTOGRAPHIC MASKING SYSTEM

Vsevolod Tulagin, Rochester, and Leonard M. Carreira, Penfield, N.Y., assignors to Xerox Corporation, Rochester, N.Y.
Original application Mar. 31, 1970, Ser. No. 24,152, now Patent No. 3,649,515. Divided and this application Oct. 8, 1971, Ser. No. 187,842
Int. Cl. G03g 13/22
U.S. Cl. 96—1.2
10 Claims

ABSTRACT OF THE DISCLOSURE

A rapid masking system in image producing apparatus and method by forming color selected first images for immediate use in exposing a photosensitive material especially of the photoelectrophoretic type for use as masks for image correction or formation.

---

Figure 1:
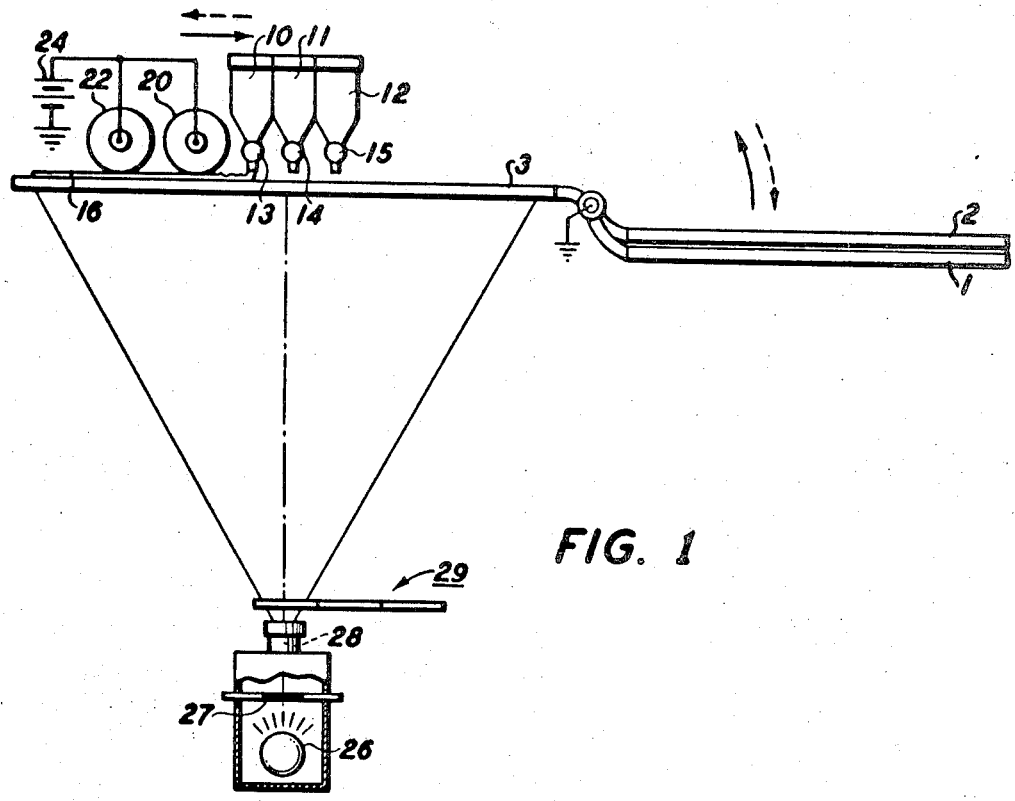

This is a division, of application Ser. No. 24,152, filed Mar. 31, 1970, now Pat. No. 3,649,515.

This system relates to imaging systems and more particularly to systems employing optical masking techniques.

The invention herein evolves around the new photoelectrophoretic imaging systems disclosed in Pat. Nos. 3,383,993; 3,384,448; 3,384,565 and 3,384,566. They disclose how to produce a visual image at one or both of two electrodes between which photoelectrophoretic particles suspensions are placed. The particles are photosensitive and appear to undergo a net change in charge polarity or a polarity alteration by interaction with one of the electrodes upon exposure to activating electromagnetic radiation. Mixtures of two or more differently colored particles can secure various colors of images. The particles will migrate from one of the electrodes under the influence of an electric field when struck with energy of a wavelength within the spectral response curve of the colored particles. The colors may be used independently or in subtractive color synthesis using particles of yellow, magenta and cyan colored particles. In a monochromatic system, i.e. a system employing particles of substantially one color, the particles will migrate if energy of any wavelength within the panchromatic spectrum of the particle response strikes the particle.

Certain terms of art have been used in conjunction with the photoelectrophoretic imaging system. A definition of these terms is helpful. The "injecting electrode" is so named because it is designed to optimize charge exchange with activated photosensitive particles during imaging. The term "photosensitive" when used in reference to particles refers to particles which, once attracted to the injecting electrode, will alter their polarity and migrate away from the electrode under the influence of an applied electric field when exposed to activating electromagnetic radiation within their spectral response curve. The term "suspension" may be defined as system having solid particles dispersed in a solid, liquid or gas. Nevertheless, the suspension preferred for use in the disclosure herein is of the general type having a solid suspended in a liquid carrier. The term "imaging electrode" is used to describe that electrode which interacts with the injecting electrode through the suspension and which once contacted by activated photosensitive particles will minimize charge exchange with the particles. The imaging electrode is covered with a dielectric surface composed of a material having a volume resistivity preferably in the order of $10^7$ or greater ohm-cm. and a conductive core member.

For photoelectrophoretic imaging to occur it is thought that these steps, not necessarily listed in the sequence that they occur, take place: (1) migration of the particles toward the injecting electrode due to the influence of an electric field; (2) the generation of charge carriers within the particles when struck with activating radiation within their spectral response curve; (3) particles deposition on or near the injecting electrode surface; (4) phenomena associated with the forming of an electrical junction between the particles and the injecting electrode; (5) particle charge exchange; (6) electrophoretic migration toward the imaging electrode; and (7) particle deposition on the imaging electrode. This leaves an image on the injecting electrode that is optically positive in light and color.

Mechanisms associated with the photoelectrophoretic imaging systems normally have a transparent electrode, preferably being the injecting electrode, through which the photosensitive pigment particles are exposed to electromagnetic radiation. These particles absorb the radiation, undergoing the phenomena of charge exchange, and migrate under the influence of the applied field between the injecting and imaging electrodes.

Color images are made using the photoelectrophoretic imaging process by a single exposure to a polychromatic photosensitive particle suspension to visible light energy having wavelengths within the sensitivity range of the particles. In a polychromatic system generally the particles are yellow, cyan and magenta being, ideally, exclusively absorbent of blue, red and green light respectively. However, since all known pigments are non-ideal in response to the visible light spectrum the single exposure of such inks to a "white" light source product inaccurate color reproductions.

In printing and photographic arts standard color correcting or masking techniques have been evolved. These techniques are based upon the knowledge that yellow pigments substantially selectively absorb blue light while magenta pigments substantially selectively absorb green light and the cyan pigments absorb substantially selectively red light.

It is well known, however, that all colorants are imperfect and most of them absorb light in the regions of the spectrum where they should be essentially transparent or at least not add to the absorption. A first order of approximation which describes the above phenomena mathematically and which has been used in the industry for a long time is given by Hanson, Evans and Brewer—"Principles of Color Photography" on p. 443. Magenta pigments absorb some blue light and cyan pigments absorb some blue and green light. If the color of a reproduction of combinations of yellow and cyan or magenta is too yellow, it can be corrected by removing yellow pigment from that area. Since both magenta and cyan also absorb blue light (which they should reflect) they have added unwanted blue density from the standpoint of reproduction. By removing some of the yellow the blue reflectance of the system can be corrected. Since the cyan has unwanted green density, removal of magenta pigment offsets the unwanted green density of the cyan. Therefore, correct hue reproduction of blue colors is achieved by removing some of the magenta pigment where cyan and magenta pigments are deposited.

In photographic color reproduction in order to change or improve the color rendition of a reproduction from an original it is common practice to make transparent color masks from an original, for example, a transparency. To make a green color mask, expose the original with green light to a photosensitive film. The film (black and white) then becomes a color correction mask. Similarly, to form a red separation, expose the original to a photographic film with red light or white light filtered through a red filter.

To form a reproduction of the transparency and color correct it, it is common practice to combine the color correction masks with the transparency to make color separations. The green mask is combined in the transparency to make the blue separation. The blue separation is made by exposing a photosensitive film to the combination of transparency and mask using blue light. Illuminating the original transparency and a green color mask with blue light removes excess yellow where there is the presence of magenta.

The pigments used in photoelectrophoresis show the following deficiencies: The red density is primarily due to the cyan pigment and relatively little contribution is made by the magenta and the yellow. The green density, however, is not due exclusively to the magenta but receives a substantial contribution from the cyan pigment and a small amount of contribution from the yellow pigment. The situation in the case of the blue density is even worse. Often approximately half of the blue density is due to the yellow pigment and the other half is due to the blue absorption of the cyan and the magenta pigments.

The visual effects resulting from the use of such imperfect pigments are primarily seen in the greens which are quite deficient in yellow and appear blue or blue-green and are secondarily seen in the de-saturation of the blues and the cyans and yellows and an overall increase of neutral density in the color picture. Color correction masks used to eliminate these undesirable effects are divided into two classes—the black and white masks which are usually used to correct individual negatives in a color separation step and color masks which are usually used as a part of a color image or as an overlay over a color image. In the latter case the color mask represents proper color correction for all the colorants used. That is, only one color correction mask is used. It must be remembered, however, that this color separation mask may actually consist of a multilayer film and that the one mask in reality represents a plurality of color correction images.

It is an object of this invention to reduce the steps required for color balancing in color reproduction. Another object of this invention is to rapidly prepare and use color and photographic masks. A further object of this invention is to use a previously made image to mask itself. Another object of this invention is to improve masking with photoelectrophoretic images. Another is to improve reduction in cost and time for forming color corrected images.

Figure 2:
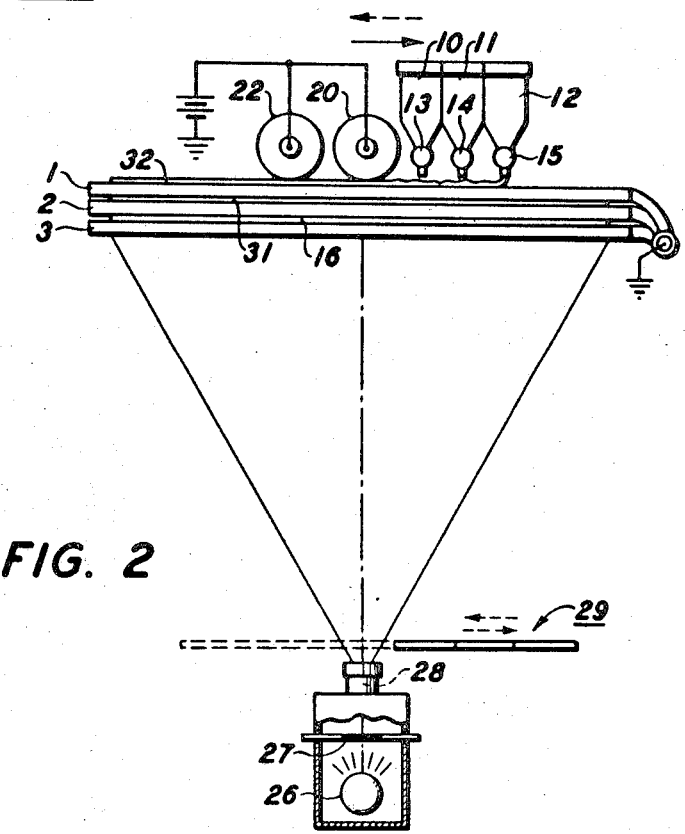
Figure 3:
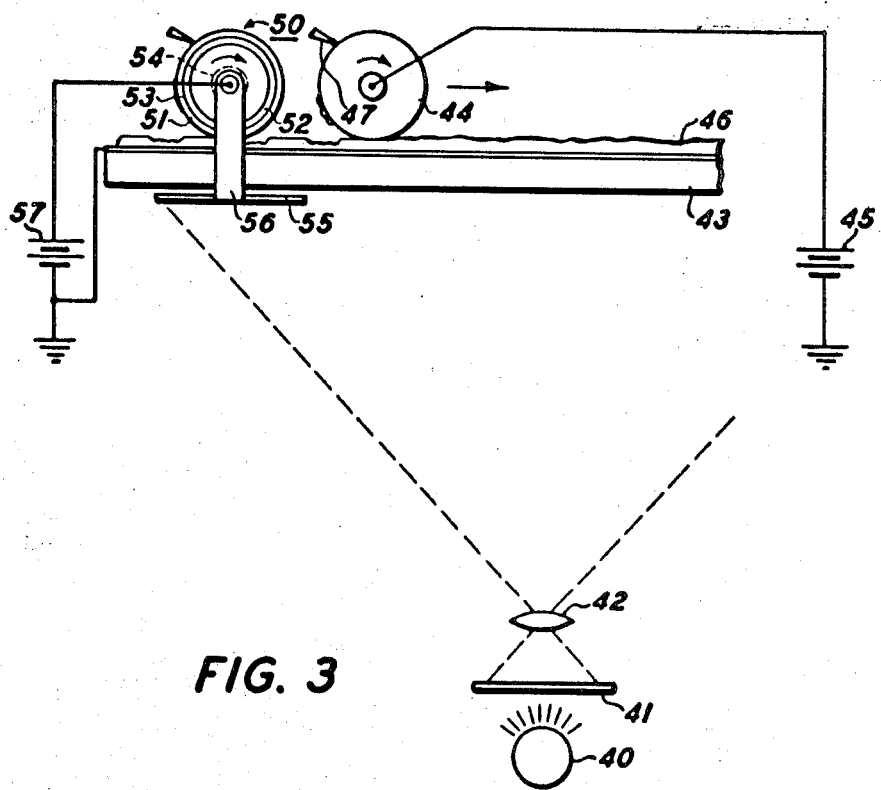

These and other objects and advantages of this invention will become apparent to those skilled in the art after reading the description in conjunction with the accompanying drawings wherein:

FIG. 1 schematically represents an embodiment of this invention for forming a photographic mask;

FIG. 2 represents another view of the embodiment shown schematically in FIG. 1 at another stage of its operation; and FIG. 3 schematically represents another embodiment of this invention.

The invention herein is described and illustrated in specific embodiments having specific components listed for carrying out the functions of the apparatus. Nevertheless, the invention need not be thought of as being confined to such a specific showing and should be construed broadly within the scope of the claims. Any and all equivalent structures known to those skilled in the art can be substituted for specific apparatus disclosed as long as the substituted apparatus achieves a similar function. It may be that other processes or apparatus will be invented having similar needs to those fulfilled by the apparatus described and claimed herein and it is the intention herein to describe an invention for use in apparatus other than the embodiments shown.

The schematic representation of FIG. 1 shows a photoelectrophoretic imaging apparatus having three injecting electrodes 1–3 which is composed of a transparent glass member coated with a transparent electrically conductive material such as, for example, tin oxide. Imaging suspension is applied to the conductive surface of the injecting electrode by one of the three inking mechanisms 10–12. Each is controlled by a valve 13–15 respectively. In FIG. 1, a monochromatic photoelectrophoretic imaging suspension 16 is dispensed from the dispenser 10. Moving behind the dispenser mechanisms are the imaging electrodes 20 and 22. The imaging electrodes have a surface composed of a dielectric material sleeve and an electrically conductive substrate which is connected to a potential source 24. The injecting electrodes are electrically connected to ground to give the necessary field effect at the imaging area between the injecting and imaging electrodes.

An exposure mechanism including an illumination source 26, an original 27 for exposure and a lens 28 projects a focused image at the image plane occupied by the injecting electrodes.

A filter mechanism 29 is slidably imposed on the optical path of a projection system. This slide is shown adapted to contain three filters which may be, for example, red, green, blue or any other filter desired for the monochromatic photoelectrophoretic suspension systems found in the suspension dispensers. Other mechanisms can be used to move the filters into and out of the optical path.

FIG. 2 shows the mechanism of FIG. 1 after a monochromatic image 16 formed from the monochromatic colorant of dispenser 10 is formed on the injecting electrode 3. A second monochromatic colorant 31 is imaged on a second injecting electrode 2 after being dispensed from the dispenser 11. As viewed, the dispenser 12 is dispensing a polychromatic colorant 32 onto the injecting electrode 1 which is being photoelectrophoretically imaged as described in the above cited patents by the imaging electrodes 20 and 22. Alternatively, the monochromatic colorant 31 could be imaged over the monochromatic colorant 16 thereby eliminating the injecting electrode 2.

The projection sytem is projecting the same image as was projected for each of the monochromatic image formations except that no filters need be, although they certainly may be, interposed in the system from the slide 29. (A compensating transparent glass may be inserted to maintain the optical object to image distance of the system.) The previous monochromatic images formed on the injecting electrodes 2 and 3 mask the light rays penetrating to the injecting electrode 1 for imaging of the polychromatic photoelectrophoretic system. These masks were rapidly formed and are positioned without registration error since the projection that formed the monochromatic image masks is continuing to form the final image without movement of the optical system. The masks 16 and 31 were imaged and developed simultaneously by an optical system that was changed only in that a differently colored filter from the slide 29 was inserted into the optical path for forming the images of the masks. This system provides for color masking without registration error in a very rapid time. Any number of masks may be used without departing from the scope of the invention shown herein.

A preferred masking system utilizes a method of producing negative images. A method of achieving this type imaging for incorporation into a system for producing a negative color mask includes using the photoelectrophoretic imaging mode but covering the imaging electrode, for example, electrodes 20 and/or 22, with a photosensitive material such as phthalocyanine which acts essentially to photoexcite particles (see copending application Ser. No. 675,892, filed Oct. 17, 1967, now Pat. No. 3,535,-221). That is, phthalocyanine on the imaging electrode photo injects charges into a pigment which is inactive in the particular region of the spectrum and migrates the pigment towards the injecting electrode instead of away from it, as in a conventional imaging. In this manner a negative image is formed on the injecting electrode. For example, negative images of yellow pigment can be made using red light and an imaging electrode covered with phthalocyanine.

A very substantial amount of color correction for photoelectrophoretic images can be obtained with a single mask made with red light. This is a direct consequence of the fact that most of the color error in the polychrome photoelectrophoretic process is due to the rather poor characteristics of phthalocyanine which is generally used as cyan colorant. One further fortunate circumstance exists to make this masking effective. The desired mask would absorb light principally in the green and blue regions of the spectrum; it would be either orange or red in color. Such a pigment is obviously transparent to red light therefore the desired mask could be prepared quite easily by reflecting a red pigment from the imaging electrode. It is preferred that the masked image be essentially transparent in regions of low exposure, that is, it should be a good negative image. The maximum densities required for masking are quite low and can be easily obtained. However, in order to obtain the low minimum densities desired it may be necessary to precharge a pigment layer coated on an imaging electrode with a corona or a charging roll so that the pigment is predominately unipolar. Procedures for the preparation of a unipolar suspension are highly recommended for the purposes of producing preferred photoelectrophoretic masks.

The full procedure to be followed in the negative masking technique is as follows: A red pigment is coated either on the imaging or the injecting electrode but preferably on the imaging electrode. It is preferable that the pigment be unipolar. The transparency that is to be used for the imaging is placed in the projector and illuminated with red light or exposes the imaging material through a red filter. The imaging electrode contains an outer layer of phthalocyanine or another red sensitive photoreceptor. Since the masking pigment is red it would be essentially transparent to red light so that an orange or red colored image is produced by reflection of the masking pigment from the imaging electrode. This image could then be used in any one of the configurations described above as a negative image for the principal exposure of a photoelectrophoretic suspension containing three pigments and capable of full color rendition.

Since the orange mask produced renders the highlights deep orange, a color correction factor must be present in the system. This could be accomplished by using a blue rich light for exposure to compensate for the color filtering action of the mask; alternatively, the color rendition characteristics of the photoelectrophoretic suspension could be so adjusted that it would display a much greater sensitivity in the blue and green regions of the spectrum than in the red region so that the suspension itself would produce clean white highlights in the orange light that would come through the negative mask employed. The regions in the original which were opaque to red light in this system now receive a relatively greater amount of exposure in the blue and green regions of the spectrum. Thus the proper masking technique is applied and the system is color corrected in the desired way.

FIG. 3 utilizes the photoelectrophoretic imaging system to form a color mask with the polychromatic image acting as its own mask for rendering itself as the final image. A projection system utilizing an illumination source 40 projects an image of the original 41 through a lens 42 to an injecting electrode 43. A first imaging electrode 44 connected to an electrical source 45 creates a field between itself and the grounded conducting surface of the injecting electrode 43. As the electrode 44 travels over the polychromatic imaging suspension 46 it causes a migration of unwanted particles by the photoelectrophoretic imaging process described above. A scraper blade 47 is provided to remove particles from the surface of the imaging electrode so that they do not interfere with further imaging by the imaging electrode.

Following the movement of the imaging electrode 44 across the injecting electrode 43 is a second imaging electrode 50. It is formed with a transparent blocking outer surface 51 placed over a transparent plastic or glass cylinder 52 between which is sandwiched an electrically conductive transparent layer 53. Within the second imaging electrode 50 is an illumination source 54, such as a tubular lamp for emitting electromagnetic radiation within the response curve of the photoelectrophoretic imaging suspension 46. Although not shown in the figures, an optical system can be positioned to travel within the second imaging electrode 50 between the lamp 54 and the cylinder 52. For example, there might be light condensers, filters or other optical equipment to enhance the illumination at the interface position between the second imaging electrode 50 and the suspension. Traveling with the second imaging electrode is a light baffle 55 hinged or in some manner fastened to the traveling electrode 50 by a bracket 56 or any other suitable means. This prevents illumination from the light source 40 from striking the imaging suspension between the injecting electrode 43 and the imaging electrode 50. The second imaging electrode is coupled to an electrical source 57 at the electrically conductive coating layer 53.

The second imaging pass over the remainder of the photoelectrophoretic imaging suspension 46 uses illumination passed through the suspension 46 to the interface of that suspension with the injecting electrode 43. Therefore, any light striking the interface must pass through the suspension between the second imaging electrode 50 and the injecting electrode 43. In this manner, the suspension acts as its own mask for forming the final image remaining after the imaging electrode 50 traverses the injecting electrode 43. For particular biasing of color correction, filters can be added between the illumination source 54 and the cylinder 51. These filters can be predetermined by knowing the spectral response characteristics of the pigment particles of the photoelectrophoretic imaging suspension and then by biasing the spectral input from the lamp source 54 by filters suitably housed between that lamp source on the interface.

Various drives and mechanical and electrical connections are not shown in the schematic representation of the attached figures. However, it is understood that means known to those in the art can be used to implement the drawings shown to cause them to function in the manner described herein. Such means and all equivalents thereof including methods of color balancing and photographic filtering as well as machine design are not fully described herein since they are known to those skilled in the art and could readily be applied by such persons to the invention claimed in light of the disclosure herein.

While this invention has been described with reference to the structures disclosed herein and while certain theories have been expressed, it is not confined to the details set forth; and this application is intended to cover such modifications or changes as may come within the purposes of the improvements and scope of the following claims.

What is claimed is:

1. A method of color masking comprising the steps of:
   (a) providing a first monochromatic photosensitive layer of imaging suspension responsive to light energy within the spectral sensitivity range of the light image of step (b) below;
   (b) exposing the first monochromatic photosensitive layer of imaging suspension to a light image of a multicolored original to form simultaneously with exposure a mask image from the first monochromatic photosensitive layer of imaging suspension;
   (c) providing a second photosensitive layer of imaging suspension capable of producing multicolor images said first and second photosensitive layers of imaging suspension comprising photoelectrophoretic particles in a carrier liquid;
   (d) providing a second photosensitive layer of imaging suspension to a light image of the same multicolored original using the same illumination source and the same multicolored original to photosensitive layer distance as in step (b) above, through the mask image to form simultaneously with the exposure of the second photosensitive layer of imaging suspension a multicolored image from the second photosensitive layer of imaging suspension; and (e) subjecting said first and second photosensitive layers of imaging suspension to an electrical field between opposed electrodes during exposure.

2. The method of claim 1 wherein the exposing of step (b) is through an optical filter.

3. The method of claim 1 wherein the exposing of step (d) is not through an optical filter.

4. The method of claim 1 wherein each light image is a projected light image and continuously projected, in time, through both exposures.

5. A method of color masking comprising the steps of:
(a) providing a first, monochromatic photosensitive layer of imaging suspension responsive to light energy within the spectral sensitivity range of the light image of step (b) below;
(b) exposing the first photosensitive layer of imaging suspension to a light image of a multicolored original to form simultaneously with exposure a mask image from the first photosensitive layer of imaging suspension;
(c) providing a second photosensitive layer of imaging suspension capable of producing multicolor images;
(d) exposing the second photosensitive layer of imageing suspension to a light image of a multicolored original through the mask to form simultaneously with the exposure of the second photosensitive layer of imaging suspension a multicolor image from the second photosensitive layer of imaging suspension; wherein the first and second photosensitive layers of imaging suspension comprise photoelectrophoretic particles in a carrier liquid and including the step of subjecting the layers of imaging suspension to an electrical field between opposed electrodes during exposing; wherein the electrode opposite the direction of exposing radiation of steps (b) and (d) comprises a photosensitive surface responsive to the exposing radiation of step (b) and where the mask image formed from the first photosensitive layer of imaging suspension is a negative image.

6. The method of claim 5 wherein the exposing of step (d) is of a light image of the same multicolored original using the same illumination source and the same multicolored original to photosensitive layer distance as in step (b) above wherein each light image is a projected light image and is continuously projected in time through both exposures.

7. The method of claim 6 wherein the color of the photoelectrophoretic particles of the first photosensitive layer of monochromatic imaging suspension is complementary to the primary photosensitive response of said photosensitive surface.

8. A method of color masking comprising the steps of:
(a) subjecting a layer of suspension to an applied electric field between first and second electrodes, said first electrode being optically transparent, said suspension comprising a plurality of at least two differently colored finely divided particles in a carrier liquid, each of said particles comprising an electrically photosensitive pigment whose principal light absorption band substantially coincides with its principal photosensitive response, said pigment being both the primary electrically photosensitive ingredient and the primary colorant for the particles, exposing the layer of suspension between the first and second electrodes to electromagnetic radiation of a multicolored original passing through the first electrode whereby simultaneously with exposure a multicolored image is formed;
(b) providing a transparent third electrode;
(c) placing the multicolor image between the first and third electrodes;
(d) applying a potential difference between said first and third electrodes;
(e) uniformly exposing the multicolored image between said first and third electrodes to electromagnetic radiation within the response curve of at least portions of the multicolored image and passing through the third electrode to form simultaneously with the uniform exposure a color corrected multicolored image from the multicolored image.

9. The method of claim 8 wherein the uniform exposing of step (e) is through an optical filter.

10. The method of claim 8 wherein the uniform exposing of step (e) is in the absence of light from the multicolored original.

References Cited

UNITED STATES PATENTS

| | | | |
|---|---|---|---|
| 2,203,652 | 6/1940 | Ehrenfried | 96—6 |
| 3,384,565 | 5/1968 | Tulagin et al. | 96—1.3 X |
| 2,760,862 | 8/1956 | Harsh | 96—6 |
| 3,251,689 | 5/1966 | Hellmig | 96—9 |
| 3,160,504 | 12/1964 | Montain | 96—44 X |

ROLAND E. MARTIN, JR., Primary Examiner

U.S. Cl. X.R.

96—1.3, 1 PE, 5, 6, 7, 8, 9, 44

/ PO-1050
(5/69)

UNITED STATES PATENT OFFICE
CERTIFICATE OF CORRECTION

Patent No. 3,810,758    Dated May 14, 1974

Inventor(s) Vsevolod Tulagin and Leonard M. Carreira

It is certified that error appears in the above-identified patent and that said Letters Patent are hereby corrected as shown below:

Column 1, line 56, insert --a-- between as and system to read, as a system.

Column 2, line 2, delete "particles" and insert --particle--.

Column 2, line 27, delete "product" and insert --produce--.

Column 4, line 37, delete "sytem" and insert --system--.

Column 4, line 68, delete "photo injects" and insert --photoinjects--.

Claim 5, subparagraph (d), line 28, delete "imageing" and insert --imaging--.

Signed and sealed this 1st day of October 1974.

(SEAL)
Attest:

McCOY M. GIBSON JR.
Attesting Officer

C. MARSHALL DANN
Commissioner of Patents